(12) United States Patent
Van Lare et al.

(10) Patent No.: US 11,879,096 B2
(45) Date of Patent: Jan. 23, 2024

(54) SALT OF MONOCHLOROACETIC ACID WITH CHELATING AGENT FOR DELAYED ACIDIFICATION IN THE OIL FIELD INDUSTRY

(71) Applicant: NOURYON CHEMICALS INTERNATIONAL B.V., Arnhem (NL)

(72) Inventors: Cornelis Elizabeth Johannus Van Lare, Deventer (NL); Maria Antonieta Leon Matheus, Epse (NL); Jannes Schutte, Epe (NL); Cornelis Kooijman, Deventer (NL)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 109 days.

(21) Appl. No.: 17/250,257

(22) PCT Filed: Jun. 17, 2019

(86) PCT No.: PCT/EP2019/065805
§ 371 (c)(1),
(2) Date: Dec. 22, 2020

(87) PCT Pub. No.: WO2020/002011
PCT Pub. Date: Jan. 2, 2020

(65) Prior Publication Data
US 2021/0115326 A1 Apr. 22, 2021

(30) Foreign Application Priority Data
Jun. 26, 2018 (EP) .................................. 18179849

(51) Int. Cl.
*C09K 8/74* (2006.01)
*C09K 8/76* (2006.01)

(52) U.S. Cl.
CPC .................. *C09K 8/74* (2013.01); *C09K 8/76* (2013.01); *C09K 2208/10* (2013.01); *C09K 2208/32* (2013.01)

(58) Field of Classification Search
CPC .. C09K 2208/10; C09K 2208/32; C09K 8/74; C09K 8/76; D06F 23/02; D06F 39/14;
(Continued)

(56) References Cited

U.S. PATENT DOCUMENTS 3,885,630 A 5/1975 Richardson
4,122,896 A 10/1978 Scheuerman et al.
(Continued)

FOREIGN PATENT DOCUMENTS

GB 2000825 A 1/1979
GB 2519388 A 4/2015
(Continued)

OTHER PUBLICATIONS

EPO, European Extended Search Report issued in EP Application No. 18179849.7, dated Dec. 3, 2018.
(Continued)

*Primary Examiner* — Frances Tischler
(74) *Attorney, Agent, or Firm* — LORENZ & KOPF, LLP

(57) ABSTRACT

The disclosure is directed to a process for treating a subterranean earth formation by introducing a monovalent salt of monochloroacetic acid into said subterranean earth formation in the presence of a chelating agent which comprises at least one carboxylate group having a monovalent counterion and furthermore comprises a carbon chain carrying at least five hydroxyl groups. Preferably the cation of the monovalent salt of monochloroacetic acid is sodium.

19 Claims, 2 Drawing Sheets

Schematic view of core flooding set-up.

(58) Field of Classification Search
CPC .......... D06F 25/00; D06F 37/10; D06F 37/28; D06F 58/02; D06F 58/04
See application file for complete search history.

(56) References Cited

U.S. PATENT DOCUMENTS

| | | | |
|---|---|---|---|
| 5,084,105 | A | 1/1992 | Morris et al. |
| 7,004,254 | B1 | 2/2006 | Chatterji et al. |
| 9,341,052 | B2 | 5/2016 | Gadberry et al. |
| 2005/0189113 | A1 | 9/2005 | Cassidy et al. |
| 2009/0042748 | A1 | 2/2009 | Fuller |
| 2014/0113843 | A1 | 4/2014 | Shumway |
| 2014/0296113 | A1 | 10/2014 | Reyes et al. |
| 2015/0211345 | A1 | 7/2015 | Reyes et al. |
| 2015/0232744 | A1 | 8/2015 | Beuterbaugh et al. |
| 2015/0260021 | A1* | 9/2015 | Reyes .................. C09K 8/528 166/300 |
| 2016/0115376 | A1 | 4/2016 | Nasr-El-Din et al. |

FOREIGN PATENT DOCUMENTS

| | | |
|---|---|---|
| RU | 2447124 C2 | 4/2012 |
| RU | 2598959 C2 | 10/2016 |
| WO | 2015030801 A1 | 3/2015 |
| WO | 2016093814 A1 | 6/2016 |

OTHER PUBLICATIONS

EPO, International Search Report issued in International Application No. PCT/EP2019/065805, dated Sep. 3, 2019.

Hongyi Wu etc.; "Preparation of NTS chelating agent"; Applied Chemical Industry; 1998-12-30; Issue: No. 4.

Albert Bokkers; "A Matrix Acidizing System for Controlled Carbonate Well Stimulation using a Carboxylic Acid Salt with a Chelating Agent"; he SPE/IADC Middle East Drilling Technology Conference and Exhibition; Abu Dhabi, UAE; May 25, 2021.

* cited by examiner

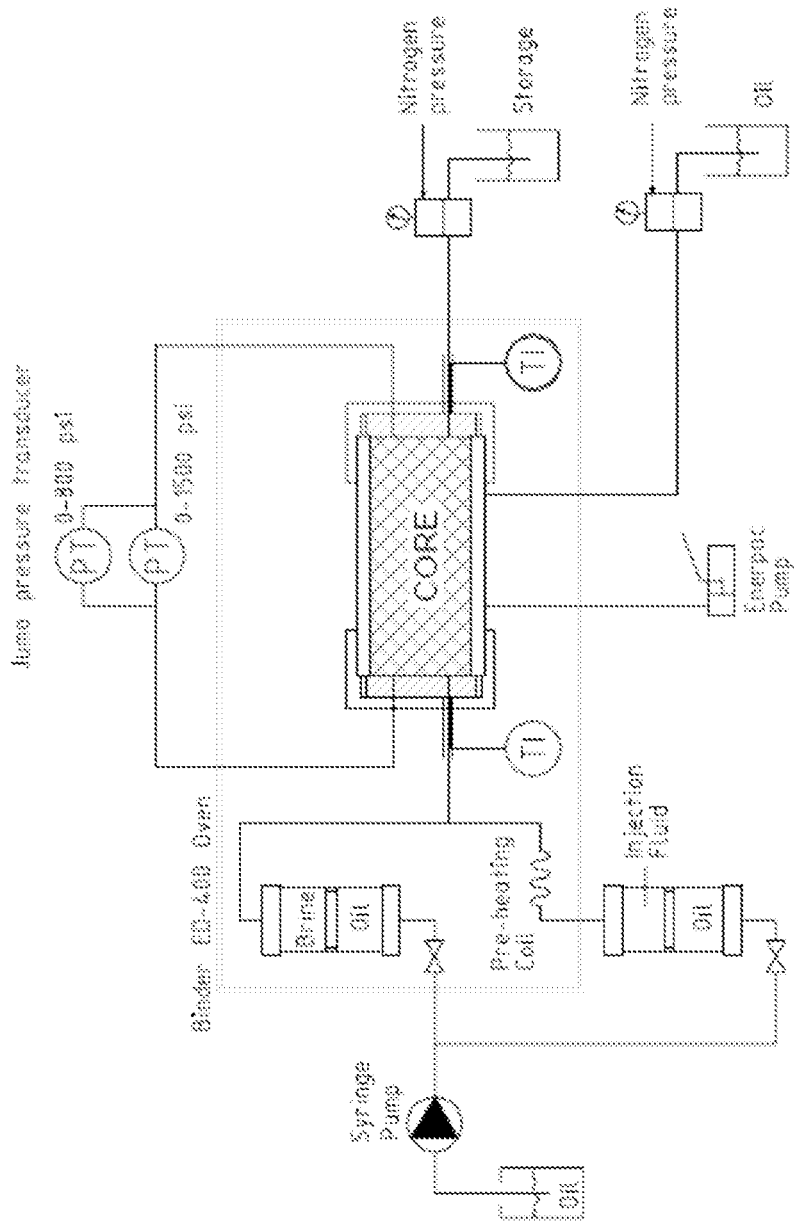
Fig. 1: Schematic view of core flooding set-up.

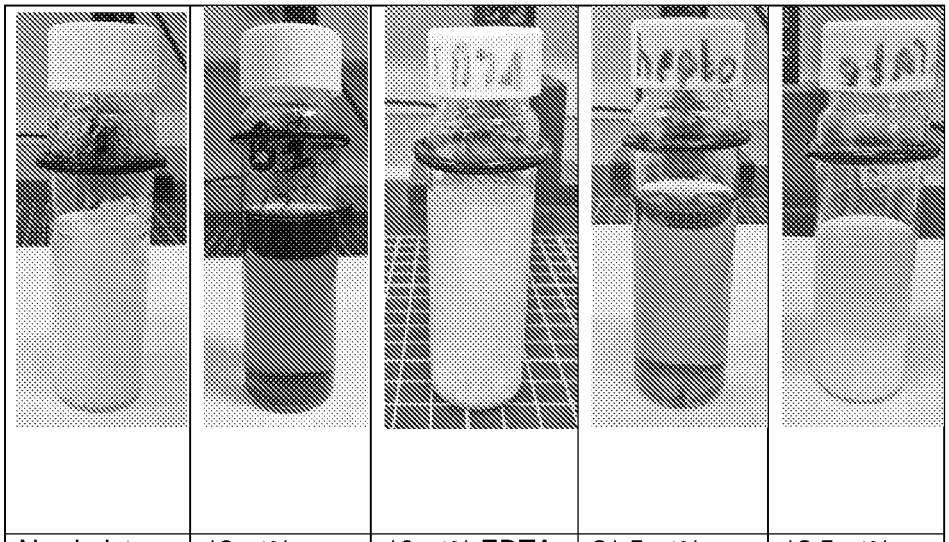

SALT OF MONOCHLOROACETIC ACID WITH CHELATING AGENT FOR DELAYED ACIDIFICATION IN THE OIL FIELD INDUSTRY

CROSS-REFERENCE TO RELATED APPLICATION

This application is a U.S. National-Stage entry under 35 U.S.C. § 371 based on International Application No. PCT/EP2019/065805, filed Jun. 17, 2019, which was published under PCT Article 21(2) and which claims priority to European Application No. 18179849.7, filed Jun. 26, 2018, which are all hereby incorporated in their entirety by reference.

TECHNICAL FIELD

The present disclosure is directed to a process for treating a subterranean earth formation and an aqueous acidizing treatment fluid therefor.

BACKGROUND

Acidification fluids are commonly used in the oil industry to create wormholes and to connect the wellbore with the formation. Typically, hydrochloric acid (HCl) has been used for decades. However, HCl has a main disadvantage related to its high reactivity with the calcium carbonate ($CaCO_3$) present in the limestone reservoirs. The reactivity of the HCl is highly affected by the temperature in the reservoir. The higher the temperature, the faster the HCl reacts, thus forming wormholes with unstable structures that may subsequently collapse and block the access to the formation. For the previous reasons, when using HCl containing acidification fluid at higher temperatures specific measures need to be taken. This evidently increases costs and limits application freedom. Another disadvantage is the high corrosivity and this makes the acidizing treatment expensive. As a rule of thumb, up to 200° F. (93° C.) the treatment can be performed with HCl and a corrosion inhibitor, but above 200° F. (93° C.) a corrosion inhibitor intensifier is also needed. The use of corrosion inhibitor intensifiers adds to the costs of acidifying fluids. They can be up to 60% of the total costs of the treatment.

There is a need to access deeper wells as many of the recently discovered reservoirs are categorized as High Pressure High Temperature (HPHT). In that sense, it is of interest to find an alternative option to the HCl, which is not as reactive when exposed to high temperatures and offers an acidification feature which can be released in a controlled fashion.

Several publications have been published trying to address these issues:

US 2014/0296113 discloses a method of servicing a wellbore in a subterranean formation comprising preparing a wellbore servicing fluid comprising an amino multicarboxylic acid chelating agent, a pH adjusting compound, and an aqueous base fluid, and contacting the wellbore servicing fluid with scale deposits on a surface in fluid communication with the wellbore and/or subterranean formation.

GB 2519388 discloses a process for treating formation damage in an underground formation comprising the use of a cyclodextrin comprising treatment fluid which may also comprise an acid, an organic acid precursor, a chelating agent and a chelating agent precursor.

WO 2015/030801 relates to acidizing fluids for use in subterranean applications, and more specifically, to complexing-acidizing self-diverting treatment fluids and methods relating thereto for use in subterranean formations comprising carbonates.

US 2009/0042748 relates to stimulation of wells penetrating subterranean formations. More particularly it relates to matrix acidizing of sandstone; most particularly it relates methods of injecting matrix acidizing fluids that include polymeric additives into a sandstone formation without the use of acid preflush.

US 2016/0115376 relates to a process to treat a subterranean formation by introducing into the formation a composition containing between 1 and 40 wt % on total weight of the composition of a chelating agent selected from the group of glutamic acid N,N-diacetic acid or a salt thereof (GLDA), aspartic acid N,N-diacetic acid or a salt thereof (ASDA), and methylglycine N,N-diacetic acid or a salt thereof (MGDA), wherein the process contains a soaking step.

U.S. Pat. No. 3,885,630 is directed to a method wherein acid-reactive material in or around a bore hole or well is acidized by contacting water-soluble weak acid and water-soluble weak acid salt such as acetic acid and sodium acetate.

U.S. Pat. No. 4,122,896 is directed to a method wherein subterranean reservoirs are acidized by injecting into the reservoir a substantially acid-free aqueous solution of a chloro carboxylic acid salt, such as mono or di-chloro acetic acid salt or 2 chloro propionic acid salt.

The latter two publications describe delayed acidification using the hydrolysation of chlorocarboxylic acid salts. During the hydrolyzation glycolic acid and HCl are formed. It was however found that the glycolic acid formed may react with the calcium carbonate being present in the lime stone reservoirs forming calcium glycolate. The calcium glycolate may cause plugging in the piping if a sufficient amount of precipitate is formed. Calcium glycolate has low solubility and precipitates easily. Precipitation of calcium glycolate during acidation in the oil wells (also referred to as scaling), is undesirable. It was further found that solutions with calcium glycolate in solution form a gel upon cooling to room temperature. This gelation may cause plugging of the pipes.

The present disclosure aims to find solutions to the above-identified problems.

BRIEF SUMMARY

This disclosure provides a process for treating a subterranean earth formation by introducing a monovalent salt of monochloroacetic acid into said subterranean earth formation in the presence of a chelating agent which comprises at least one carboxylate group having a monovalent counterion and furthermore comprises a carbon chain carrying at least five hydroxyl groups.

This disclosure also provides an aqueous acidizing treatment fluid comprising a monovalent salt of monochloroacetic acid, and a chelating agent which comprises at least one carboxylate group having a monovalent counterion and furthermore comprises a carbon chain carrying at least five hydroxyl groups.

BRIEF DESCRIPTION OF THE DRAWINGS

The present disclosure will hereinafter be described in conjunction with the following drawing figures, wherein like numerals denote like elements, wherein:

FIG. 1 shows a schematic diagram for the core flooding apparatus; and

FIGS. 2a-2e are photographs of samples of Examples 1, 2, and 4 as described in detail below.

DETAILED DESCRIPTION

The following detailed description is merely exemplary in nature and is not intended to limit the disclosure or the application and uses as contemplated herein. Furthermore, there is no intention to be bound by any theory presented in the preceding background as contemplated herein or the following detailed description.

The disclosure is directed to a process for treating a subterranean earth formation by introducing a monovalent salt of monochloroacetic acid into said subterranean earth formation in the presence of a chelating agent which comprises at least one carboxylate group having a monovalent counterion and furthermore comprises a carbon chain carrying at least five hydroxyl groups.

In the present disclosure, only a monovalent salt of monochloroacetic acid is used. "Monovalent salt of monochloroacetic acid" means that the cation in the monochloroacetate salt has a valency of one. Preferably the cation, (also denoted as the monovalent counterion) of the salt of monochloroacetic acid is chosen from lithium, potassium, sodium, and ammonium. The cation of the salt of monochloroacetic acid is sodium (the sodium salt of monochloroacetic acid is hereinafter also denoted as SMCA).

The number of carboxylate groups of the chelating agent (n) is between about 1 and about 5 (or in other words, the chelating agent comprises 1, 2, 3, 4, or 5 carboxylate groups). Preferred chelating agents are chosen from monovalent salts of glucaric acid, monovalent salts of gluconic acid, monovalent salts of glucoheptonic acid and other stereoisomers of 2,3,4,5,6-pentahydroxyhexanoic acid and 2,3,4,5,6,7-hexahydroxyheptanoic acid (wherein "monovalent salt" means that the carboxylate group(s) of the chelating agent has/have monovalent cation(s)). Specific examples are sodium gluconate, sodium glucoheptonate, other stereoisomers of sodium 2,3,4,5,6-pentahydroxyhexanoate and sodium 2,3,4,5,6,7-hexahydroxyheptanoate.

Usually more than 2 wt % of chelating agent is present and the molar ratio between the salt of monochloroacetic acid (e.g. sodium monochloroacetate) and the chelating agent lies between about 1:0.5/n and about 1:10/n, n being the number of carboxylate groups of the chelating agent.

In the process according to the disclosure the monovalent salt of the monochloroacetic acid and the chelating agent may be introduced into the subterranean formation in the form of an aqueous acidizing treatment fluid comprising the monochloroacetate salt and the chelating agent.

In the process according to the disclosure the temperature of the earth formation into which the monochloroacetate salt according to the disclosure and the chelating agent are introduced may be between about 80 and about 200° C., typically between about 85 and about 180° C., between about 90 and about 160° C.

The disclosure is directed to an aqueous acidizing treatment fluid comprising
  (i) a monovalent salt of monochloroacetic acid, and
  (ii) a chelating agent which comprises at least one carboxylate group having a monovalent counterion and furthermore comprises a carbon chain carrying at least five hydroxyl groups.

The disclosure is further directed to an aqueous acidizing treatment fluid wherein the monochloroacetate salt as contemplated herein is present in an amount of at least about 3 wt %, typically at least about 5 wt %, and at least about 10 wt % (based on the total amount of the aqueous acidizing treatment fluid). The aqueous acidizing treatment fluid typically comprises at most about 20 wt % of the monochloroacetate salt, typically at most about 18 wt % of the monochloroacetate salt, and, at most about 14 wt % of the monochloroacetate salt (based on the total amount of the aqueous acidizing treatment fluid). In general, the salt of monochloroacetic acid is present in an amount of between about 3 and about 20 wt %, typically between about 4 and about 18 wt % and between 5 and about 14 wt %, based on the total weight of the aqueous acidizing treatment fluid. The concentration of the monochloroacetate salt may be adjusted to the desired dissolution power of the treatment fluid. It will be clear to the person skilled in the art that the solubility of the total formulation is also dependent on the temperature at which the treatment fluid is used.

In general the molar ratio between the monovalent salt of the monochloroacetic acid (preferably being sodium monochloroacetate) and the chelating agent as contemplated herein in the aqueous acidizing treatment fluid lies between about 1:0.5/n and about 1:10/n, typically between about 1:0.5/n and about 1:5/n and between about 1:0.8/n and about 1:about 2/n, n being the number of carboxylate groups in the chelating agent (being 1, 2, 3, 4, or 5).

The aqueous acidizing treatment fluid according to the disclosure may further comprise one or more conventional additives from the group of mutual solvents, anti-sludge agents, (water-wetting or emulsifying) surfactants, corrosion inhibitors, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, combinations thereof, or the like.

The various aspects of the present disclosure will be elucidated further below.

As indicated above, the disclosure is directed to a process for treating a subterranean earth formation by introducing a monovalent salt of monochloroacetic acid into said subterranean earth formation in the presence of a chelating agent which comprises at least one carboxylate group having a monovalent counterion and furthermore comprises a carbon chain carrying at least five hydroxyl groups.

In the present disclosure, only a monovalent salt of monochloroacetic acid is used. "Monovalent salt of monochloroacetic acid" means that the cation in the monochloroacetate salt has a valency of one. Preferably the cation, (also denoted as the monovalent counterion) of the salt of monochloroacetic acid is chosen from lithium, potassium, sodium, and ammonium. The cation of the salt of monochloroacetic acid is sodium (the sodium salt of monochloroacetic acid is hereinafter also denoted as SMCA).

The monovalent salt of monochloroacetic acid can hydrolyse into Glycolic Acid (GA) and hydrochloric Acid (HCl). The hydrolysation rate depends on the temperature, concentration and pH. With the use of a salt of monochloroacetic acid, a well-controlled delayed acidification could be established.

It was found that with the addition of a chelating agent which comprises at least one carboxylate group having a monovalent counterion and furthermore comprises a carbon chain carrying at least five hydroxyl groups, the formation of calcium glycolate is inhibited, so that scaling and plugging may be avoided.

Further, with the process according to the disclosure face dissolution at the injection site may be inhibited or avoided altogether, so that nicely formed wormholes are created, the stability of the earth formation is ensured and the acidizing treatment fluid is effectively used.

The chelating agent comprises at least one carboxylate group having a monovalent counterion. "Monovalent counterion" denotes a cation of which the valency is one. Examples of suitable cations are sodium, ammonium, lithium, and potassium.

Depending on the type of rock to be treated the most preferred cation can be chosen. In the case of carbonate-based rock the cation of the salt of monochloroacetic acid typically is sodium, potassium and/or lithium. In the case of sandstone ammonium is the preferred cation.

The number of carboxylate groups of the chelating agent n is between about 1 and about 5, with n typically being 1. Preferred chelating agents are chosen from monovalent salts of glucaric acid, monovalent salts of gluconic acid, monovalent salts of glucoheptonic acid, uronic acids such as galacturonic acids, aldonic acids and other stereoisomers of 2,3,4,5,6-pentahydroxyhexanoic acid and 2,3,4,5,6,7-hexahydroxyheptanoic acid (wherein "monovalent salt" means that the carboxylate group(s) of the chelating agent has/have monovalent cation(s)). Specific examples are sodium gluconate, sodium glucoheptonate, other stereoisomers of sodium 2,3,4,5,6-pentahydroxyhexanoate and sodium 2,3,4,5,6,7-hexahydroxyheptanoate.

In the process according to the disclosure, the monovalent salt of the monochloroacetic acid and the chelating agent are introduced into the subterranean formation in the form of an aqueous acidizing treatment fluid comprising the monovalent salt of monochloroacetic acid and the chelating agent.

Usually more than about 2 wt % of chelating agent is used (based on the total weight of the treatment fluid) and the molar ratio between the salt of monochloroacetic acid and the chelating agent lies between about 1:0.5/n and about 1:10/n, n being the number of carboxylate groups of the chelating agent.

In the process according to the disclosure the temperature of the earth formation into which the monochloroacetate salt and the chelating agent are introduced is typically between about 85 and about 180° C., between about 90 and about 160° C.

The disclosure is directed to an aqueous acidizing treatment fluid comprising
  (i) a monovalent salt of monochloroacetic acid, and
  (ii) a chelating agent which comprises at least one carboxylate group having a monovalent counterion and furthermore comprises a carbon chain carrying at least five hydroxyl groups.

As is shown in the examples, a mixture of monochloroacetic acid salt in a concentration of above about 4 wt % will form a precipitation with calcium carbonate. However, with the addition of a chelating agent according to the disclosure, this precipitation can be avoided and monochloroacidic acid salts may be used in concentrations above about 8 wt %, or even higher (e.g. about 10 wt %). From the experimental data it is clear that this effect could not be reached with other conventional multi-carboxylate chelating agents such as EDTA and trisodiumcitrate.

Therefore, the disclosure is further directed to an aqueous acidizing treatment fluid wherein the monochloroacetate salt as contemplated herein is present in an amount of at least about 3 wt %, typically at least about 5 wt % and at least about 10 wt %, based on the total amount of treatment fluid. The aqueous acidizing treatment fluid typically comprises at most about 20 wt % of the monochloroacetate salt, typically at most about 18 wt % of the monochloroacetate salt and, at most about 14 wt % of the monochloroacetate salt (based on the total amount of the aqueous acidizing treatment fluid). The concentration of the monochloroacetate salt may be adjusted to the desired dissolution power of the treatment fluid. It will be clear to the person skilled in the art that the solubility of the total formulation is also dependent from the temperature at which the treatment fluid is used.

In general, the monochloroacetate salt as contemplated herein is present in an amount of between about 3 and about 20 wt %, typically between about 4 and about 18 wt % and between about 5 and about 14 wt %, based on the total weight of the aqueous acidizing treatment fluid.

In general, the molar ratio between monochloroacetate salt as contemplated herein and the chelating agent of the aqueous acidizing treatment fluid lies between about 1:0.5/n and about 1:10/n, typically between about 1:0.5/n and 1:5/n and between about 1:0.8/n and about 1:2/n, n being the number of carboxylate groups in the chelating agent.

The aqueous acidizing treatment fluid according to the disclosure contains water as a solvent for the other ingredients wherein water can be e.g. fresh water, produced water or seawater. Other solvents may be added as well for instance to create emulsions. Suitable other solvents are ketones, alcohols or esters.

The aqueous acidizing treatment fluid according to the disclosure may further comprise one or more conventional additives from the group of mutual solvents, anti-sludge agents, (water-wetting or emulsifying) surfactants, corrosion inhibitors, corrosion inhibitor intensifiers, foaming agents, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, combinations thereof, or the like.

A mutual solvent is a chemical additive that is soluble in oil, water, acids (often HCl based), and other well treatment fluids. Mutual solvents are routinely used in a range of applications, controlling the wettability of contact surfaces before, during and/or after a treatment, and preventing or breaking emulsions. Suitable mutual solvents are ketones, alcohols or esters.

The surfactant can be any surfactant known to the person skilled in the art for use in oil and gas wells. Preferably, the surfactant is a nonionic or cationic surfactant, even more preferably a cationic surfactant.

Anti-sludge agents stabilize the acid-oil emulsion and include alkyl phenols, fatty acids, and anionic surfactants. Frequently used as the surfactant is a blend of a sulfonic acid derivative and a dispersing surfactant in a solvent. Such a blend generally has dodecyl benzene sulfonic acid (DDBSA) or a salt thereof as the major dispersant, i.e. anti-sludge, component.

Corrosion inhibitors may be selected from the group of amine and quaternary ammonium compounds and sulfur compounds. Examples are diethyl thiourea (DETU), which is suitable up to about 185° F. (about 85° C.), alkyl pyridinium or quinolinium salt, such as dodecyl pyridinium bromide (DDPB), and sulfur compounds, such as thiourea or ammonium thiocyanate, which are suitable for the range from about 203-302° F. (about 95-150° C.), benzotriazole (BZT), benzimidazole (BZI), dibutyl thiourea, a proprietary inhibitor called TIA, and alkyl pyridines.

One or more corrosion inhibitor intensifiers may be added, such as for example formic acid, potassium iodide, antimony chloride, or copper iodide.

In general, the most successful inhibitor formulations for organic acids and chelating agents contain amines, reduced sulfur compounds or combinations of a nitrogen compound (amines, quats or polyfunctional compounds) and a sulfur compound. The amount of corrosion inhibitor is typically between about 0.1 and about 5.0 volume %, between about 0.1 and about 2.0 volume % on total fluid.

One or more salts may be used as rheology modifiers to modify the rheological properties (e.g., viscosity and elastic properties) of the treatment fluids. These salts may be organic or inorganic. When adding salts care should be taken not to detrimentally affect the pH and therewith detrimentally affect the hydrolyzation rate.

Wetting agents that may be suitable for use in this disclosure include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art.

Gelling agents in a preferred embodiment are polymeric gelling agents. Examples of commonly used polymeric gelling agents include, but are not limited to, biopolymers, polysaccharides such as guar gums and derivatives thereof, cellulose derivatives, synthetic polymers like polyacrylamides and viscoelastic surfactants, and the like. These gelling agents, when hydrated and at a sufficient concentration, are capable of forming a viscous solution.

When used to make an aqueous-based treatment fluid, a gelling agent is combined with an aqueous fluid and the soluble portions of the gelling agent are dissolved in the aqueous fluid, thereby increasing the viscosity of the fluid.

Viscosifiers may include natural polymers and derivatives such as xantham gum and hydroxyethyl cellulose (HEC) or synthetic polymers and oligomers such as poly(ethylene glycol) [PEG], poly(diallyl amine), poly(acrylamide), poly (aminomethyl propyl sulfonate) [AMPS polymer], poly (acrylonitrile), polyvinyl acetate), polyvinyl alcohol), polyvinyl amine), polyvinyl sulfonate), poly(styryl sulfonate), poly(acrylate), poly(methyl acrylate), poly(methacrylate), poly(methyl methacrylate), polyvinyl pyrrolidone), polyvinyl lactam), and co-, ter-, and quaterpolymers of the following (co-)monomers: ethylene, butadiene, isoprene, styrene, divinyl benzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinyl pyrrolidone, and vinyl lactam. Yet other viscosifiers include clay-based viscosifiers, especially laponite and other small fibrous clays such as the polygorskites (attapulgite and sepiolite). When using polymer-containing viscosifiers, the viscosifiers may be used in an amount of up to about 5% by weight of the fluid.

The use of brines is known in the art and needs no further elucidation here.

Any brine chosen should be compatible with the formation and should have a sufficient density to provide the appropriate degree of well control.

Additional salts may be added to a water source, e.g., to provide a brine, and a resulting treatment fluid, in order to have a desired density. The amount of salt to be added should be the amount necessary for formation compatibility, such as the amount necessary for the stability of clay minerals, taking into consideration the crystallization temperature of the brine, e.g., the temperature at which the salt precipitates from the brine as the temperature drops. Preferred suitable brines may include seawater and/or formation brines.

It is noted that various elements of the present disclosure, including but not limited to preferred ranges for the various parameters, can be combined unless they are mutually exclusive.

The disclosure will be elucidated by the following examples without being limited thereto or thereby.

EXAMPLES

Example 1: Dissolution of $CaCO_3$ in the Presence of SMCA

To study the forming of a precipitate, 750 g of about 10 wt % SMCA (pH about 8-9) solution was added to a stirred 1 L reactor. 32.2 g of calcium carbonate powder was added to the mixture via a funnel. The reactor was closed and the headspace was filled with 3 barg nitrogen gas. A temperature probe was continuously measuring the temperature of the solution. This solution was then heated with an oil bath to 120° C. for about 5 h. A first sample was taken from the reactor using a dip tube and the chloride concentration was measured by titration using silver nitrate to check if SMCA was completely reacted to acid. After 5 h the heating was stopped and the temperature of the reaction mixture was lowered to 80° C. at ambient pressure. A second sample of 25 mL was drained from the reactor and transferred to a glass vial. This sample was kept at a constant temperature of 40° C. in an oil bath. After 24 h it was noticed that the sample had become completely solid (see FIG. 2a). This experiment was repeated using different solutions of SMCA varying between about 2 and 8 wt % SMCA in an aqueous solution. Also the calcium carbonate was equimolar added to these solutions. As can be seen in Table 1 only the mixture containing 2 wt % SMCA gave a clear solution after reaction.

TABLE 1

Results of SMCA solutions of different concentrations with added calcium carbonate

| wt % SMCA used (based on total weight of the solution in the reactor) | Amount of SMCA (g) | Amount of calcium carbonate (g) | Precipitation of calcium salts (Y/N) |
|---|---|---|---|
| 2 | 15 | 6.4 | N |
| 4 | 30 | 12.9 | Y |
| 5 | 37.5 | 16.1 | Y |
| 6 | 45 | 19.2 | Y |
| 8 | 60 | 25.6 | Y |
| 10 | 75 | 32.2 | Y |

Example 2: Dissolution of $CaCO_3$ in the Presence of SMCA and Sodium Gluconate

Example 1 was repeated but now 10 wt % of SMCA was used in the presence of sodium gluconate. The experiment was performed using the same conditions as applied in Example 1. Only in this experiment 750 g of an aqueous solution comprising 75 g (10 wt %) of SMCA and 142.5 g (19 wt %) of D-gluconic acid sodium salt (purity 99% from Sigma Aldrich) was loaded to the reactor. Also 32.2 g of calcium carbonate was added to the reactor via a funnel. The reactor was subsequently closed and the headspace was filled with 3 barg nitrogen gas. A temperature probe was continuously measuring the temperature of the solution. This solution was then heated with an oil bath to 120° C. for about 5 h. A first sample was taken from the reactor using a dip tube and the chloride concentration was measured by titration to check if SMCA was completely converted to acid. After 5 h the heating was stopped and the temperature of the reaction mixture was lowered to 80° C. at ambient pressure. A sample of 25 mL was drained from the reactor and transferred to a glass vial. This sample was kept at a constant temperature of 40° C. in an oil bath. After 24 h it was noticed that the sample was still completely clear and did not contain any precipitates (see FIG. 2b). Thus, by the addition of a chelating agent according to the present disclosure, high amounts of SMCA can be used without the forming of precipitates.

Example 3: Core-Flood Test with 10 wt % SMCA Solution and 18 wt % Sodium Gluconate at 150° C.

FIG. 1 shows a schematic diagram for the core flooding apparatus. For the core flooding test a new piece of core with a diameter of 1.5 inches (3.81 cm) and a length of 6 inches (15.24 cm) was used. The core was placed in the coreholder and shrinkable seals were used to prevent any leakage between the holder and the core. The coreholder was placed in an oven. The temperature of the heated core was controlled by a Binder ED400 series, with a fluctuation of ±0.3° C. In the inlet and outlet of the coreholder, a Pt-100 was installed to control the temperature of the injection fluid.

An Isco Syringe double piston pump was used to pump the brine or test fluid through the core and an Enerpac hand hydraulic pump was used to apply the required overburden pressure. A back pressure of 1,000 psi (6.9 MPa) was applied to keep $CO_2$ in solution. The brine solution was kept into a storage accumulator inside the oven. The test fluid was placed in a second accumulator outside the oven and connected to a pre-heating line with the coreholder.

The back pressure was controlled by a Mity-Mite back pressure regulator model S91W-EQ and kept constant at about 300-400 psi (2.1-2.8 MPa) less than the overburden pressure. The pressure drop across the core was measured with a set of Jumo dTrans p02 differential pressure transducers, and monitored by lab view software. Two gauges were installed with ranges of about 0-800 psi (0-5.5 MPa) and about 0-1500 psi (0-10.3 MPa), respectively.

Before running a core flooding test, the core was first dried in an oven at 160° F. (71° C.) and weighted. Subsequently the core was saturated with water under vacuum at room temperature. The pore volume was calculated from the difference in weight of the dried and saturated core.

The core permeability before and after the treatment was calculated from the pressure drop using Darcy's equation for laminar, linear, and steady-state flow of Newtonian fluids in porous media:

$$K=(122.81q\mu L)/(\Delta p D^2)$$

where K is the core permeability in md, q is the flow rate in $cm^3$/min, μ is the fluid, viscosity in cP, L is the core length in inch, Δp is the pressure drop across the core in psi, and D is the core diameter in inch.

Prior to the core flooding test the core was pre-heated to the required test temperature for at least 12 hours with brine at a low injection speed of 0.01 $cm^3$/min.

This procedure was used to prove the concept of creating wormholes by injecting a mixture of 10 wt % SMCA with 19 wt % sodium(D)gluconate and 0.25 wt % corrosion inhibitor at pH=7.5 into an Indiana limestone core with a permeability of 12 mD, flow rate 1.5 cm3/min.

Upon inspection of the core, by employing a CT scan, it was shown that with the process according to the disclosure nicely formed wormholes are formed without face dissolution.

Example 4: Dissolution of $CaCO_3$ in the Presence of 10 wt % of SMCA and Various Chelating Agents To study the performance of various chelating agents, crystalline EDTA-$Na_4$ tetra hydrate, also known as product Dissolvine Na-X from AkzoNobel, trisodium citrate dihydrate (with a purity of 99% from J. T. Baker) and α-D-glucoheptonic acid sodium salt (with a purity of 99% from Sigma Aldrich) were separately equipmolar mixed with 750 g of an aqueous 10 wt % SMCA solution. The same procedure as explained in example 1 was applied for each mixture. Accordingly, after addition of a solution of SMCA and the respective chelating agent to the reactors, 32.2 g of calcium carbonate was added to each reactor. After a reaction time of 5 h at 120° C. samples were taken from the reaction mixtures to check the complete release of acid and a sample of 25 mL was taken separately and controlled for 24 h at 40° C.

TABLE 2

Overview of chelating agents used in Example 4

| | Chelating agent | Amount (g) |
|---|---|---|
| 1 | EDTA-$Na_4$ tetra hydrate | 72.8 |
| 2 | trisodium citrate dihydrate | 93.0 |
| 3 | α-D-glucoheptonic acid sodium salt | 159.8 |

When comparing the reaction product of the mixture of SMCA with respectively $Na_4$-EDTA, trisodium citrate and sodium glucoheptonate, it was clear that only the sample starting from SMCA with sodium glucoheptonate was still completely clear (see FIG. 2d) and did not contain any precipitates. The reaction mixtures starting from respectively SMCA with $Na_4$-EDTA and SMCA with trisodium citrate were filled with precipitates (see FIG. 2c and FIG. 2e, respectively).

This example demonstrates that formation of a precipitate from the reaction of SMCA and calcium carbonate can be prevented by using a chelate according to the present disclosure.

Example 5: $CaCO_3$ Dissolution Rate of SMCA and MCA

The time required to dissolve a given amount of $CaCO_3$ with SMCA and MCA is compared in this example. The reaction rate of this process can be controlled by temperature. SMCA hydrolyses with water and by heating into glycolic acid and sodium chloride. Glycolic acid reacts very fast with $CaCO_3$. The extent of this reaction is followed by measuring the concentration of chloride. 750 g of 10 wt % SMCA (pH about 8-9) solution was added to a stirred 1 L reactor. 32.2 g of calcium carbonate powder was added to the mixture via a funnel. The reactor was closed, and the headspace is filled with 3 barg nitrogen gas. A temperature probe was continuously measuring the temperature of the solution. This solution was then heated with an oil bath to 100° C. Samples were taken using a dip tube and a pressurized sample system. These samples were analysed on chloride to calculate the hydrolysis rate. Chloride was measured by titration using silver nitrate. The chloride concentration was then compared with the theoretical amount of chloride when all SMCA is converted into glycolic acid and sodium chloride. When full hydrolyzation was reached, it was assumed that $CaCO_3$ was completely dissolved. This procedure was repeated for temperatures at 140 and 160° C. The time measured to completely dissolve $CaCO_3$ with SMCA at various temperatures is depicted in Table 3. For 10 wt % MCA a different procedure was used. Due to its high reactivity, the experiment was carried out at room temperature and atmospheric pressure. 750 g of 10 wt % MCA solution and 39.7 g of calcium carbonate powder were added to a glass vessel. The time to completely dissolve $CaCO_3$ with MCA was monitored visually and it is shown in Table 3. These results confirm the $CaCO_3$ dissolution rate of SMCA is much slower than the $CaCO_3$ dissolution rate of MCA which is advantageous to access deeper wells.

TABLE 3

$CaCO_3$ dissolution rate for SMCA and MCA

| | Temperature (° C.) | Time needed for complete $CaCO_3$ dissolution (min) |
|---|---|---|
| 10 wt % SMCA | 100 | 540 |
| 10 wt % SMCA | 140 | 60 |
| 10 wt % SMCA | 160 | 43 |
| 10 wt % MCA | 25 | 5 |

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A process for treating a subterranean earth formation, said process comprising the step of introducing an aqueous acidizing treatment fluid into the subterranean earth formation wherein the fluid comprises:
    about 3 to about 20 weight percent of a sodium, potassium, and/or lithium salt of monochloroacetic acid based on a total weight of the fluid, and
    a chelating agent chosen from sodium gluconate, sodium glucoheptonate, and combinations thereof,
    wherein the chelating agent is present in a molar ratio of the salt to the chelating agent of from about 1:0.5 to about 1:10, and
    wherein the process is free of a step of independently adding monochloroacetic acid to the aqueous acidizing treatment.

2. The process according to claim 1 wherein the subterranean earth formation comprises carbonate-based rock.

3. The process according to claim 1 wherein the subterranean earth formation comprises sandstone.

4. The process according to claim 1 wherein the salt is sodium monochloroacetate.

5. The process according to claim 1 wherein the temperature of the earth formation into which the salt of monochloroacetic acid and the chelating agent are introduced is between about 80 and about 200° C.

6. The process according to claim 1 wherein the temperature of the earth formation into which the salt of monochloroacetic acid and the chelating agent are introduced is between about 90 and about 160° C.

7. The process of claim 1 wherein the salt is present in an amount of from about 4 to about 18 weight percent based on a total weight of the fluid.

8. The process of claim 7 wherein the salt is a sodium salt.

9. The process of claim 8 wherein the chelating agent is sodium gluconate.

10. The process of claim 7 wherein the chelating agent is sodium gluconate.

11. The process of claim 1 wherein the salt is present in an amount of from about 5 to about 14 weight percent based on a total weight of the fluid.

12. The process of claim 11 wherein the salt is a sodium salt.

13. The process of claim 12 wherein the chelating agent is sodium gluconate.

14. The process of claim 11 wherein the chelating agent is sodium gluconate.

15. The process of claim 1 wherein the chelating agent is present in an amount of from about 18 to about 21 weight percent based on a total weight of the fluid.

16. The process of claim 1 wherein the chelating agent is sodium gluconate.

17. The process of claim 1 wherein the chelating agent is sodium glucoheptonate.

18. A process for treating a subterranean earth formation, said process comprising the step of introducing an aqueous acidizing treatment fluid into a subterranean earth formation wherein the fluid comprises:
    about 5 to about 14 weight percent of a sodium salt of monochloroacetic acid based on a total weight of the fluid, and
    about 18 to about 21 weight percent of sodium gluconate based on a total weight of the fluid,
    and wherein the process is free of a step of independently adding monochloroacetic acid to the aqueous acidizing treatment.

19. A process for treating a subterranean earth formation, said process comprising the step of by introducing an aqueous acidizing treatment fluid into the subterranean earth formation wherein the fluid comprises:
    about 3 to about 20 weight percent of an ammonium salt of monochloroacetic acid based on a total weight of the fluid, and
    a chelating agent chosen from sodium gluconate, sodium glucoheptonate, and combinations thereof, wherein the chelating agent is present in a molar ratio of the ammonium salt to the chelating agent of from about 1:0.5 to about 1:10, and wherein the process is free of a step of independently adding monochloroacetic acid to the aqueous acidizing treatment.

* * * * *